T. N. HUGHES.
ANIMAL-TRAP.
No. 186,252. Patented Jan. 16, 1877.
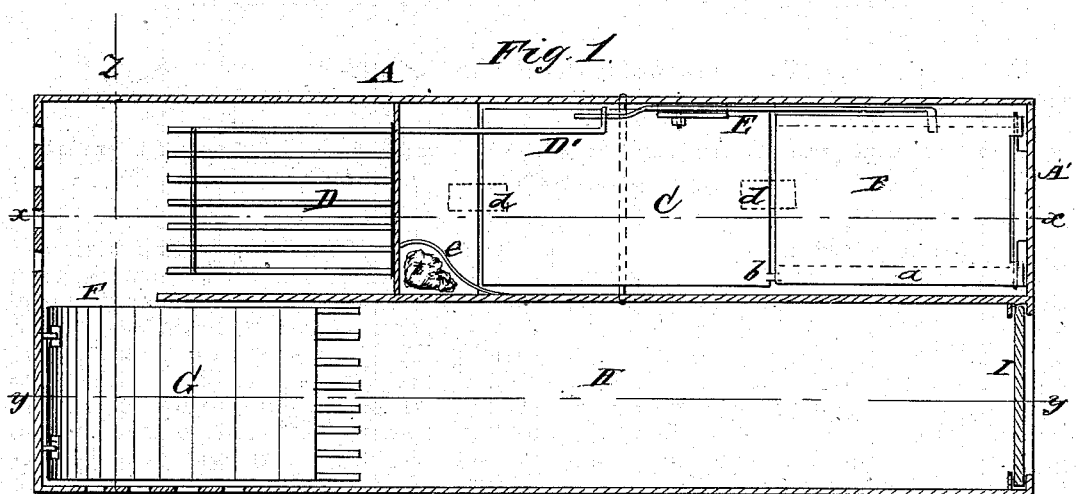
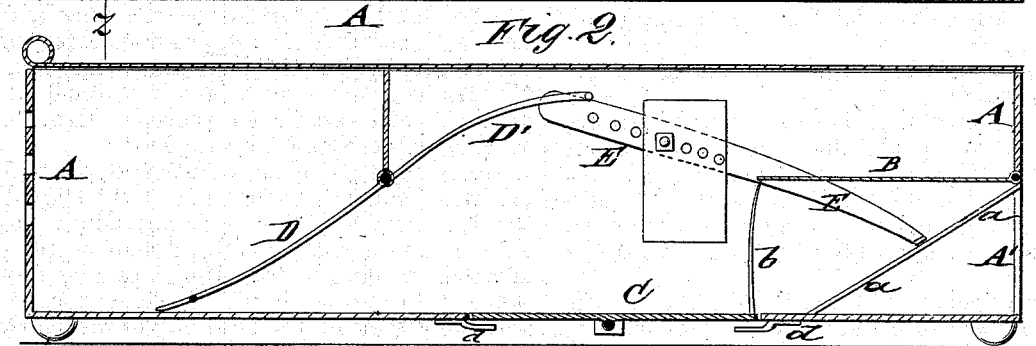
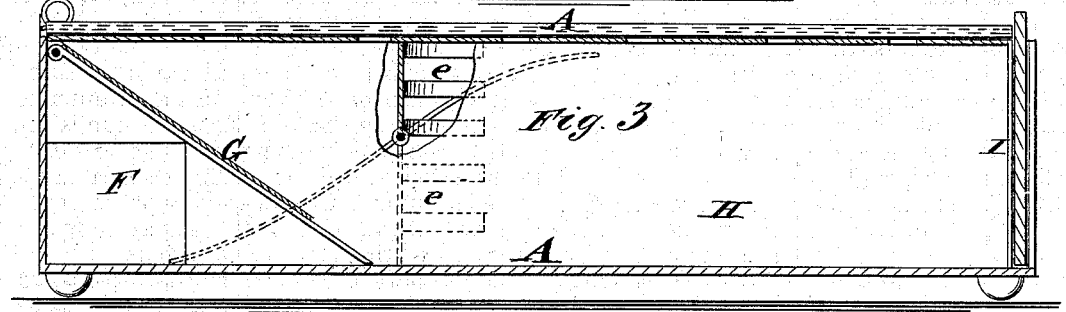
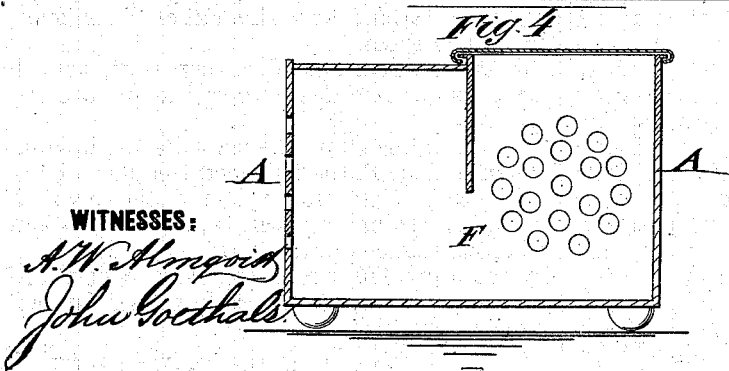
WITNESSES:
A. W. Almquist
John Goethals
INVENTOR:
T. N. Hughes
BY
Munn
ATTORNEYS.

UNITED STATES PATENT OFFICE.

THOMAS N. HUGHES, OF MUDDY CREEK, TENNESSEE.

IMPROVEMENT IN ANIMAL-TRAPS.

Specification forming part of Letters Patent No. 186,252, dated January 16, 1877; application filed September 2, 1876.

*To all whom it may concern:*

Be it known that I, THOMAS N. HUGHES, of Muddy Creek, in the county of Loudon and State of Tennessee, have invented a new and Improved Animal-Trap, of which the following is a specification:

In the accompanying drawing, Figure 1 represents a horizontal section of my improved animal-trap; and Figs. 2, 3, and 4 are longitudinal and vertical transverse sections of the same, respectively on the lines $x\ x$, $y\ y$, and $z\ z$, Fig. 1.

Similar letters of reference indicate corresponding parts.

The invention relates to an improved trap for animals of all kinds, as rats, mice, and larger animals, as foxes, minks, coons, &c., that are allured by bait, the trap being automatically set again by the animal caught, to be ready for the next animal attracted by the bait.

The invention will first be described in connection with the drawing, and then pointed out in the claim.

In the drawing, A represents a trap of oblong shape, which is constructed of suitable material, size, and strength, according as it is designed for catching larger or smaller animals. The trap is divided by a longitudinal partition into two main sections, in which the working parts are disposed.

The entrance A' at the end of one section has a drop-door, B, which is arranged back of the same, resting, when closed, on side strips $a$, in inclined position, and being supported on an upright arm, $b$, of a centrally-pivoted treadle-door, C, at the bottom of the trap, when the trap is set.

The treadle-door C is only required to swing sufficiently on its pivots to release the drop-door from the arm $b$, suitable seats $d$ at the under side of the trap, at both sides of the treadle-door, preventing the door from swinging farther than necessary.

The bait is placed in a grated receptacle, $e$, near the treadle-door, and entices the animal to pass in, so as to close the drop-door B when it arrives at the part of the treadle-door near the bait. The back end of this section is perforated or grated to admit light, which attracts the frightened animal and induces it to pass toward the light, so as to raise an inclined swinging door, D, made of grated wire.

An arm, D', of door D engages a fulcrumed lever, E, which extends, by its bent-forward end, below the drop-door and raises the same, to again form contact with the arm $b$, and thereby reset the trap by the action of the animal, ready for the next victim. The lower ends or tines of the grated wire door D are bent to be nearly horizontal, so as to lie close to the bottom of the trap, and prevent thereby any possibility of the animal raising the door, as the feet will press on the tines and keep the door closed. But even in case the animal should raise the door, the contact with the treadle would again release the drop-door, and the noise occasioned thereby scare the animal back through the wire door.

An opening, E, in the partition at the end of the trap, and light-openings of the trap at the part opposite this opening, allure the animal to enter into the second main section, and then to pass toward the glass door I at the end, lifting the hinged inclined door G, and being then, on the dropping of the same, finally entrapped in the chamber H, which is of sufficient size to catch a number of animals The animals in chamber H cannot return, so as to warn or frighten off other animals attracted by the bait, so that the trap is capable of continuing its action. The bait cannot be eaten, as it is inclosed by the grated receptacle, nor can the trapped animals scare off those attracted by the bait, as they are separated by the dividing-partitions.

The top part of the trap may be grated to admit air, and the glass door at the end made to slide, to admit the taking out of the animals for killing them.

Having thus described my invention, I claim as new and desire to secure by Letters Patent—

In an animal-trap, the chamber A, having the drop-door B, the balanced treadle C, having upright $b$, the lever E, and the pivoted wire door D, having arm D', in combination with the side chamber H, having an aperture, F, and a pivoted wire frame, G, all constructed and arranged substantially as and for the purpose specified.

THOMAS NELSON HUGHES.

Witnesses:
 JAMES GRANT,
 W. H. GRIFFITH.